INVENTORS
W. C. McCARTHY
F. M. BRINKMEYER
BY
Young & Quigg
ATTORNEYS

INVENTORS
W. C. MCCARTHY
F. M. BRINKMEYER
BY Young & Quigg
ATTORNEYS

United States Patent Office 3,395,867
Patented Aug. 6, 1968

3,395,867
FRACTIONAL CRYSTALLIZATION
William C. McCarthy and Francis M. Brinkmeyer, Bartlesville, Okla., assignors to Phillips Petroleum Company, a corporation of Delaware
Filed June 21, 1963, Ser. No. 289,629
11 Claims. (Cl. 241—38)

This invention relates to the separation of fluid mixtures by fractional crystallization.

Fractional crystallization has been employed rather extensively in recent years as a method of separating materials which are difficult to separate by other known methods, such as fractional distillation or solvent extraction. Fractional crystallization is particularly useful for separating materials having close boiling points and for concentrating food products and beverages which are in the form of aqueous solutions. In this latter field, concentration by crystallization represents a considerable improvement over evaporation processes which rely upon heat or extremely low pressures. In either situation, the removal of water by evaporation often results in the loss of essential oils and esters so that the concentrated product can never be restored to its original freshness and flavor.

In U.S. Patent No. 2,854,494 to R. W. Thomas, there is disclosed a procedure for separating materials by fractional crystallization. The feed mixture is cooled in a chiller to form a slurry of crystals and mother liquor. This slurry is directed into a purification column in which the crystals are passed in a compact mass into a body of crystal melt which is displaced back into the crystal mass. The purification column includes a liquid removal zone, a reflux or crystal purification zone and a melting zone. Mother liquor is removed from the crystals in the liquid removal zone, and the crystals are melted in the melting zone. A portion of the crystal melt is withdrawin from the melting zone, and the remainder is forced back into the crystal mass in the reflux zone. This procedure is useful in separating a great variety of materials.

In many separation procedures of this type, the capacity of the system is limited by the rate at which the crystals can be melted. One limiting factor is the amount of heat that can physically be supplied to the melting zone in a purification column of any given size. Because of such limitations, it has frequently been necessary to supply heat from high temperature sources such as electrical resistance heaters. This type of operation obviously increases the cost of making the separation and can cause other difficulties. Channeling of the melt through the crystal mass may occur if too much heat is supplied to the melting zone in the end of the column. This channeling reduces the purity of the products obtained because many of the crystals are not washed by the melt. Still another problem results from poor heat transfer through the crystal mass from the heating element. This can be particularly serious when relatively large diameter purification columns are employed.

In order to overcome these difficulties, it has been proposed to scrape crystals from the crystal mass in the end of the column and transfer these crystals to an external melting zone. The crystals can readily be melted in such an external zone, and a portion of the resulting melt can be recycled to the column to provide reflux. In accordance with the present invention, improved apparatus is provided for scraping crystals from the crystal mass and transferring these crystals to an external melting zone. This apparatus comprises a rotating scraper which is of such configuration as to force the scraped crystals to the periphery of the purification column from which they are removed. The scraping mechanism is designed such that the centrifugal force which results from rotation of the scraper or an adjacent housing serves to displace the scraped crystals from the column.

Accordingly, it is an object of this invention to provide improved apparatus for use in separating fluid mixtures by fractional crystallization.

Another object is to provide novel cutting apparatus which removes crystals from a crystal mass and transports the resulting crystals from the zone in which the crystal mass is confined.

Other objects, advantages and features of the invention should become apparent from the following detailed description, taken in conjunction with the accompanying drawing in which.

Figure 1:
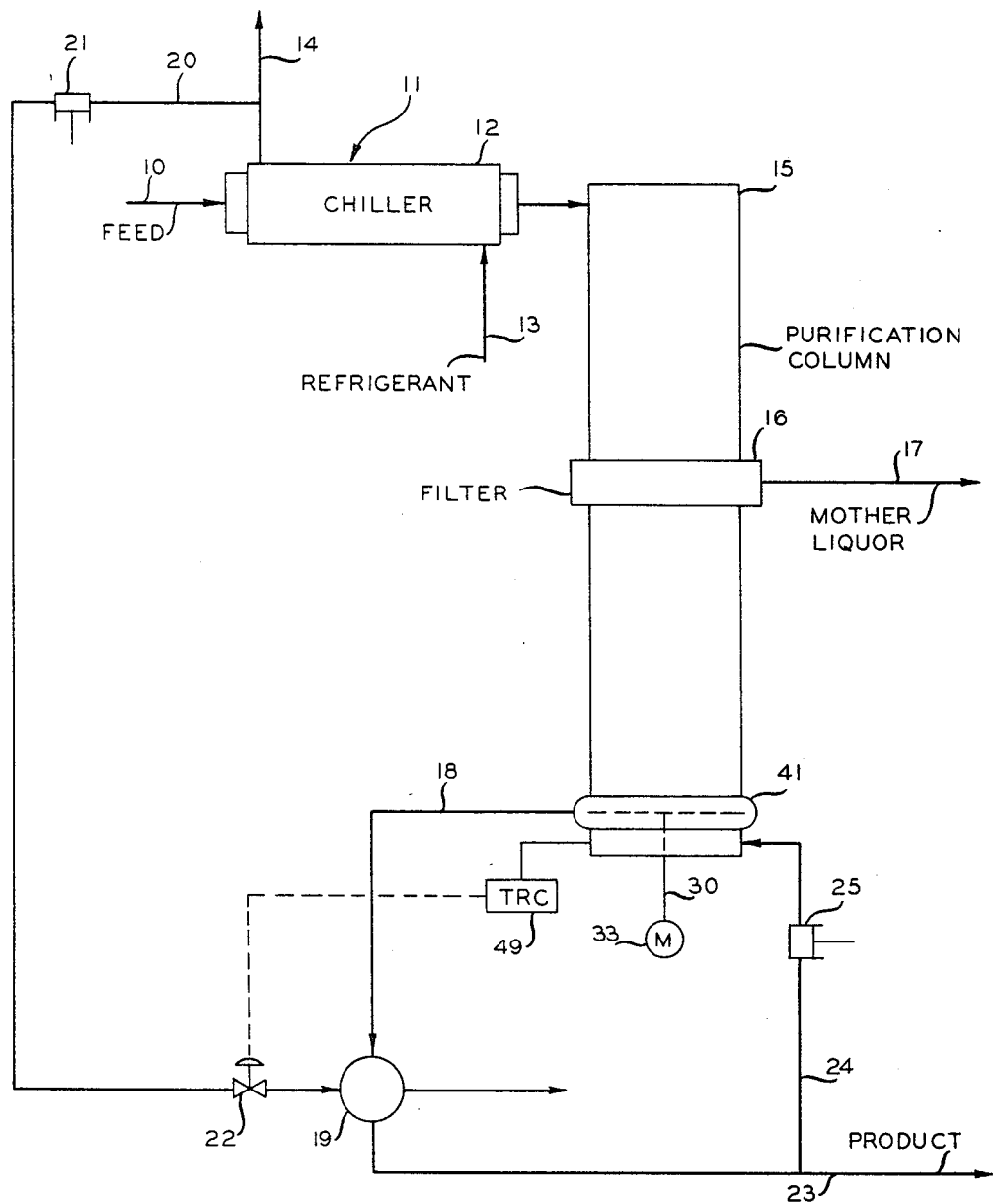
FIGURE 1 is a schematic representation of a fluid separation system employing a purification column having the crystal scraping mechanism of this invention included therein.

Referring now to the drawing in detail and to FIGURE 1 in particular, a feed mixture to be separated is supplied through a conduit 10 to the inlet of a chiller 11. Chiller 11 is provided with a jacket 12 through which a suitable refrigerant, such as liquid ammonia, is circulated. This refrigerant can be introduced through a conduit 13 and removed through a conduit 14. Chiller 11 can advantageously be a conventional scraped surface chiller. The feed mixture is cooled in passing through chiller 11 so that the effluent comprises a slurry of crystals of the component of the fluid mixture having the highest melting point. This slurry is introduced into the first end of a purification column 15. A filter 16 is disposed in the central region of column 15. This filter forms a continuation of the inner wall of the column to permit the crystals formed in chiller 11 to move toward the second end of the column. A stream of mother liquor is removed through filter 16 by means of an outlet conduit 17.

A mass of crystals moves toward the second end of column 15 which contains the cutting apparatus of this invention. Individual crystals are cut from the mass and removed through an outlet conduit 18 which communicates with a heat exchanger 19. Heat is advantageously supplied to heat exchanger 19 by removing a portion of the spent refrigerant from chiller 11 through a conduit 20 which has a compressor 21 therein. The compressed refrigerant vapors are directed through a control valve 22 into heat exchanger 19. A temperature recorder-controller 49 adjusts valve 22 to maintain a preselected temperature in the end of column 15. A portion of the resulting crystal melt is removed as a product stream through an outlet conduit 23. The remainder of the crystal melt is recycled to the second end of column 15 by means of a conduit 24 which has a pulse supplying device 25 therein. This pulsing device can be of the type described in detail in the Thomas Patent No. 2,854,494.

Figure 3:
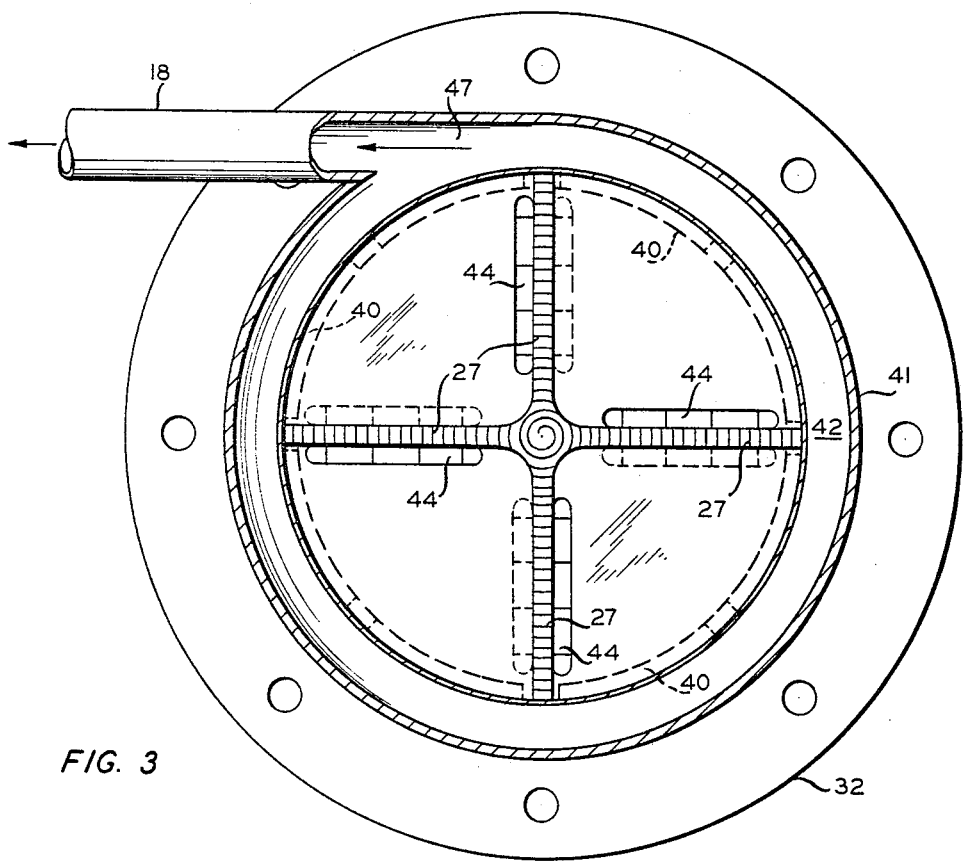
FIGURE 3 is a top view of the cutting mechanism of FIGURE 2.
Figure 2:
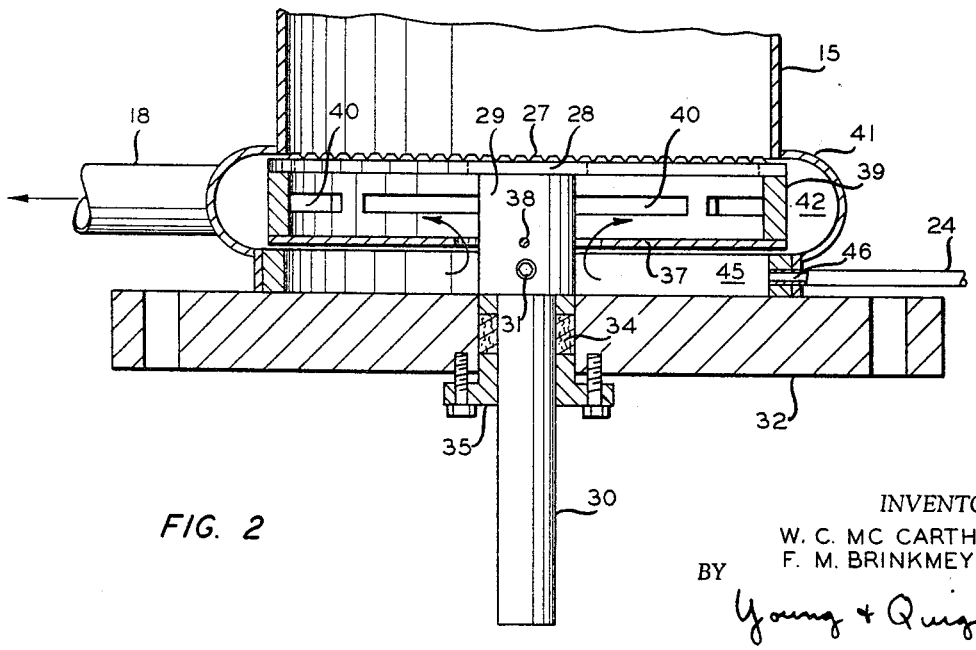
FIGURE 2 is a view, shown partially in section, of a first embodiment of the crystal cutting and pumping mechanism.

A first embodiment of the cutting apparatus of this invention is illustrated in detail in FIGURES 2 and 3. A cutting blade 27 is secured to an upper plate 28 which in turn is attached to a hub 29. Hub 29 is secured to a shaft 30 by means of a seat screw 31. Shaft 30 extends through the base 32 of column 15 and is rotated by means of a motor 33 shown in FIGURE 1. Packing material 34 surrounds shaft 30 and is held in place by means of a flange 35. A second plate 37 is secured to hub 29 at its inner edge by means of a spider assembly 38. The outer edges of plates 28 and 37 are secured together by means of an annular member 39 which is provided with a plurality of slots 40. A ring 41 forms an extension of column 15 near the base so that an annular chamber 42 is formed about member 39. A plurality of slots 44 are formed in plate 28 so as to precede cutter 27 when the assembly is rotated.

In operation, the assembly is rotated in a counterclockwise direction, as illustrated in FIGURE 3. Cutting blade 27 scrapes crystals from the crystal mass in column 15. These crystals move downwardly through slots 44 so as to occupy the region between plates 28 and 37. Crystal melt is introduced into the region 45 beneath plate 37 through one or more inlet ports 46 which communicate with conduit 24. A portion of this melt flows upwardly through column 15 to reflux the crystal mass. The centrifugal force generated by the rotating cutting assembly forces the crystals between plates 28 and 37 outwardly through slots 40 into region 42. An outlet 47 communicates with region 42 remove the slurry of crystals from the column. Thus, the cutting assembly to serves the dual functions of removing crystals from the crystal mass and pumping the resulting crystals from the column to the external heating zone 19. The cutting assembly can be rotated at any desired speed, for example from 700 to 1700 revolutions per minute.

Figure 5:
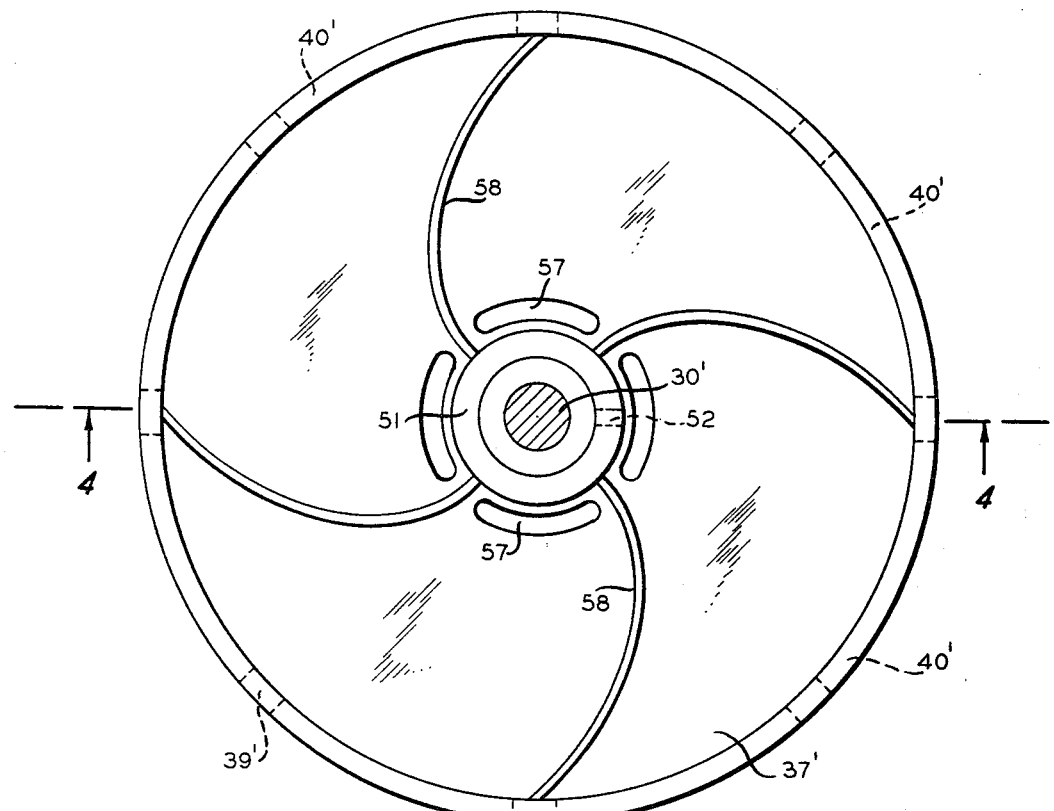
FIGURE 5 is a view, shown partially in section, of a second embodiment of the crystal cutting and pumping mechanism.
Figure 4:
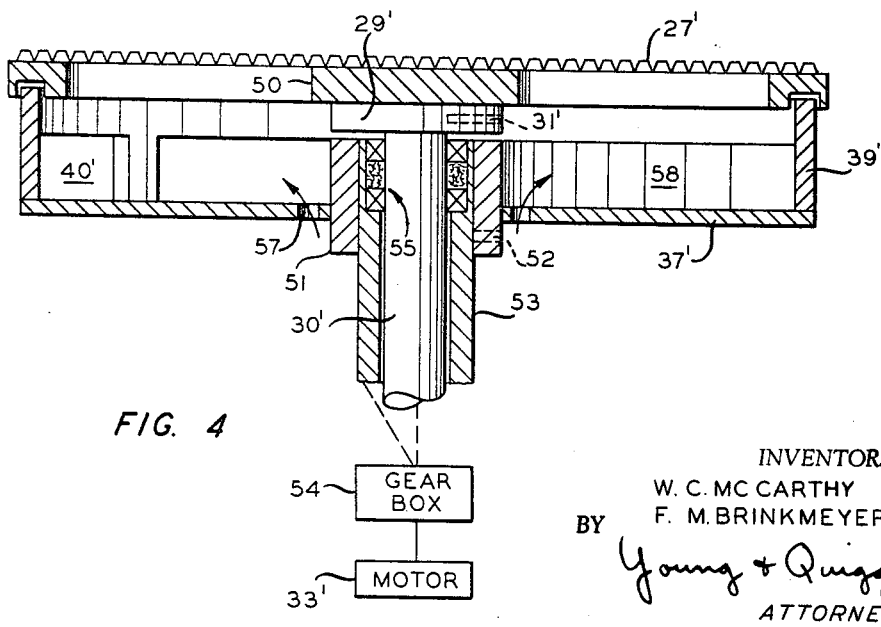
FIGURE 4 is a view taken along line 4—4 in FIGURE 5.

A second embodiment of the cutting apparatus is illustrated in FIGURES 4 and 5. Cutting blade 27' is secured to a spider 50, which in turn is secured to hub 29'. Hub 29' is attached to an inner shaft 30' by a set screw 31'. Plate 37', which supports annular member 39, is secured to a second hub 51. Hub 51 is attached to a hollow shaft 53, which encloses shaft 30', by a set screw 52. Shafts 30' and 53 are connected to motor 33' by a suitable gear box 54 so as to be rotated at different speeds. The upper ends of the shafts are retained apart by a bearing assembly 55. Shaft 53 is rotated at a relatively high speed, whereas shaft 30' is rotated at a much lower speed. As shown in FIGURE 5, plate 37' is provided with a series of openings 57 near hub 51 to permit fluid to enter the region above plate 37'. A plurality of vanes 58 are carried by plate 37' to force this fluid outwardly through opening 40' in annular member 39'. The high speed of rotation of the lower assembly pumps the fluid, whereas a much lower speed is adequate for cutter 27'. If desired, vanes can be added to the apparatus of FIGURES 2 and 3.

While this invention has been described in conjunction with presently preferred embodiments, it should be evident that it is not limited thereto.

What is claimed is:
1. Crystal purification apparatus comprising:
 (a) a column adapted to receive a crystal mass at one end,
 (b) a cutter assembly positioned adjacent the second end of said column, said cutter assembly including
  (1) first and second plates mounted in spaced relationship with one another, said plates being positioned within said column so as to be free to rotate about an axis which extends longitudinally of the column and which is perpendicular to the planes of the plates, said first plate being positioned between said second plate and said one end of said column, and
  (2) a crystal cutting means secured to the surface of said first plate which faces said one end of said column,
 (c) means forming an outlet in said column adjacent the region between said plates, and
 (d) means to rotate said first plate at a first velocity and means to rotate said second plate at a second velocity which is greater than said first velocity.
2. Crystal purification apparatus comprising:
 (a) a column adapted to receive a crystal mass at one end,
 (b) a cutter assembly positioned adjacent the second end of said column, said cutter assembly including
  (1) first and second plates mounted in spaced relationship with one another, said plates being positioned within said column so as to be free to rotate about an axis which extends longitudinally of the column and which is perpendicular to the planes of the plates, said first plate being positioned between said second plate and said one end of said column, said second plate being provided with at least one opening therein adjacent said axis, and
  (2) a crystal cutting means secured to the surface of said first plate which faces said one end of said column,
 (c) means forming an outlet in said column adjacent the region between said plates,
 (d) means for passing a liquid between said second plate and said second end of said column and through said at least one opening in said second plate into the region between said first and said second plates to form a slurry with the crystals cut from said crystal mass, and
 (e) means to rotate said plates about said axis.
3. Apparatus in accordance with claim 2 wherein said means to rotate comprises means for rotating said second plate at a velocity sufficient to force said slurry from the region between said plates through said outlet by centrifugal force.
4. Apparatus in accordance with claim 2 further comprising vanes secured to said second plate to expel fluid from the region between said plates.
5. Apparatus in accordance with claim 2 wherein said column is provided with an annular chamber surrounding the region between said plates, and said outlet communicates with said chamber in a direction tangential thereto.
6. A cutter assembly comprising:
 (a) a shaft,
 (b) first and second plates mounted on said shaft in spaced relationship with one another, the planes of said plates being perpendicular to said shaft,
 (c) a crystal cutting means secured to the surface of said first plate which is remote from said second plate, said first plate having at least one opening therein to permit cut material to enter the region between said plates,
 (d) means for introducing a liquid into the region between said plates to form a slurry with said cut material, and
 (e) means for rotating said shaft.
7. Apparatus in accordance with claim 6 wherein said second plate is provided with at least one opening therein adjacent said shaft for the introduction therethrough of said liquid, and wherein said means for rotating said shaft comprises means for actuating said shaft to rotate said plates at a velocity sufficient to force said slurry from the region between said plates by centrifugal force.
8. A cutting assembly comprising:
 (a) a first shaft,
 (b) a second shaft, said second shaft being hollow and enclosing at least part of said first shaft,
 (c) first and second plates mounted on said first and second shafts, respectively, in spaced relationship with one another, the planes of said plates being perpendicular to said shafts,
 (d) a crystal cutting means secured to the surface of said first plate which is remote from said second plate, said first plate having at least one opening therein to permit cut material to enter the region between said plates, and
 (e) means for rotating said first shaft at a first veloc- ity and to rotate said second shaft at a second velocity which is greater than said first velocity.

9. Separation apparatus comprising:
(a) a chiller having an inlet and an outlet,
(b) an elongated column having an outlet in an intermediate region thereof,
(c) means connecting the outlet of said chiller to the first end of said column,
(d) filter means disposed in the intermediate outlet of said column,
(e) a cutter assembly positioned in the second end of said column, said cutter assembly including
 (1) a shaft extending outside said column,
 (2) first and second plates mounted on said shaft in spaced relationship with one another, the planes of said plates being perpendicular to said shaft, said first plate being positioned between said second plate and said first end of said column,
 (3) a crystal cutting means secured to the surface of said first plate which faces said first end of said column, said first plate having at least one opening therein to permit cut material to enter the region between said plates,
(f) means to rotate said shaft,
(g) a heater,
(h) means communicating between the interior of said column adjacent said plates and the inlet of said heater to transport a slurry of crystals in a liquid to said heater, and
(i) means communicating between the outlet of said heater and the second end of said column to introduce a portion of the melted crystals into the region between said plates to form a slurry with said cut material.

10. Separation apparatus comprising:
(a) a chiller having an inlet and an outlet,
(b) an elongated column having an outlet in an intermediate region thereof,
(c) means connecting the outlet of said chiller to the first end of said column,
(d) filter means disposed in the intermediate outlet of said column,
(e) a cutter assembly positioned in the second end of said column, said cutter assembly including
 (1) first and second shafts extending outside said column, said second shaft being hollow and enclosing at least part of said first shaft,
 (2) first and second plates mounted on said first and second shafts, respectively, in spaced relationship with one another, the planes of said plates being perpendicular to said shafts, said first plate being positioned between said second plate and said first end of said column, and
 (3) a crystal cutting means secured to the surface of said first plate which faces said first end of said column, said first plate having at least one opening therein to permit cut material to enter the region between said plates,
(f) means to rotate said first shaft, at a first velocity and to rotate said second shaft at a second velocity which is greater than said first velocity,
(g) a heater,
(h) means communicating between the interior of said column adjacent the region between said plates and the inlet of said heater to transport crystals to said heater, and
(i) means communicating between the outlet of said heater and the second end of said column to return a portion of the melted crystals to the column.

11. A cutting assembly comprising:
(a) first and second plates mounted in spaced relationship with one another, said plates being positioned so as to be free to rotate about an axis which is perpendicular to the planes of the plates,
(b) a crystal cutting means secured to the surface of said first plate which is remote from said second plate, and
(c) means to rotate said first plate at a first velocity, and means to rotate said second plate at a second velocity which is greater than said first velocity.

References Cited

UNITED STATES PATENTS

| | | | |
|---|---|---|---|
| 2,665,852 | 1/1954 | Shively | 241—92 |
| 2,973,153 | 2/1961 | Rich | 241—92 |
| 3,323,730 | 6/1967 | Cottle | 241—92 |
| 2,421,014 | 5/1947 | Coss et al. | 241—46 |
| 2,905,397 | 9/1959 | De Angelis et al. | 241—188 |
| 2,960,843 | 11/1960 | Zdansky et al. | 62—123 |
| 3,004,397 | 10/1961 | Wenzelberger | 62—123 |
| 2,181,000 | 11/1939 | Shively | 241—92 |
| 1,762,950 | 6/1930 | Beers | 241—46 |

GERALD A. DOST, *Primary Examiner.*